US011527357B2

(12) United States Patent
Wu et al.

(10) Patent No.: US 11,527,357 B2
(45) Date of Patent: Dec. 13, 2022

(54) BUSBAR WITH TAILORED PERFORATION SIZES TO PROVIDE THERMAL PATH

(71) Applicant: Hamilton Sundstrand Corporation, Charlotte, NC (US)

(72) Inventors: Hailing Wu, Glastonbury, CT (US); Aritra Sur, South Windsor, CT (US); Xin Wu, Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 8 days.

(21) Appl. No.: 17/223,366

(22) Filed: Apr. 6, 2021

(65) Prior Publication Data

US 2021/0319952 A1    Oct. 14, 2021

Related U.S. Application Data

(60) Provisional application No. 63/008,107, filed on Apr. 10, 2020.

(51) Int. Cl.
*H01G 2/02* (2006.01)
*H01G 4/258* (2006.01)
(Continued)

(52) U.S. Cl.
CPC .............. *H01G 2/02* (2013.01); *H01G 4/224* (2013.01); *H01G 4/228* (2013.01); *H01G 4/258* (2013.01); *H01G 4/38* (2013.01); *H02M 7/003* (2013.01)

(58) Field of Classification Search
CPC ............. H01G 2/10; H01G 4/224; H01G 4/38
See application file for complete search history.

(56) References Cited

U.S. PATENT DOCUMENTS 6,822,850 B2 * 11/2004 Pfeifer ............... H05K 7/20927
257/E23.098
9,999,150 B2  6/2018 Maeda et al.
(Continued)

FOREIGN PATENT DOCUMENTS

JP   2016042770 A   3/2016
WO  2019219500 A1  11/2019

OTHER PUBLICATIONS

Alizadeh et al.; "Busbar Design for Distributed DC-Link Capacitor Banks for Traction Applications"; IEEE; 2018; pp. 4810-4815.
(Continued)

*Primary Examiner* — Eric W Thomas
(74) *Attorney, Agent, or Firm* — Cantor Colburn LLP

(57) ABSTRACT

Disclosed is an assembly including a busbar that includes: a first layer that defines: first layer top and bottom surfaces; first layer first and second ends; and a first layer center region between the first layer first and second ends; and the first layer forms first layer perforations of different sizes about the first layer center region so perforations closer to the first layer first end are smaller than perforations spaced apart therefrom; a second layer that is disposed against and electrically isolated from the first layer bottom surface, wherein the second layer defines connector orifices having a same size as each other that are aligned with the first layer perforations; and a first capacitor supported against and electrically connected to the first layer top surface, wherein the first capacitor includes busbar connectors that respectively extend through the first layer perforations to electrically connect with the connector orifices.

19 Claims, 4 Drawing Sheets

(51) Int. Cl.
*H01G 4/38* (2006.01)
*H01G 4/224* (2006.01)
*H01G 4/228* (2006.01)
*H02M 7/00* (2006.01)

(56) References Cited

U.S. PATENT DOCUMENTS

| | | |
|---|---|---|
| 2004/0062006 A1 | 4/2004 | Pfeifer et al. |
| 2006/0007720 A1* | 1/2006 | Pfeifer ............... H05K 7/20927 361/698 |
| 2010/0259898 A1 | 10/2010 | Kimura et al. |
| 2017/0186551 A1 | 6/2017 | Matsumoto et al. |
| 2018/0261991 A1 | 9/2018 | Gregoire |

OTHER PUBLICATIONS

European Search Report Issued in European Application No. 21167255.5-1201 dated Aug. 3, 2021; 9 Pages.

* cited by examiner

BUSBAR WITH TAILORED PERFORATION SIZES TO PROVIDE THERMAL PATH

CROSS-REFERENCE TO RELATED APPLICATIONS

This application claims the benefit of U.S. Provisional Application 63/008,107 filed Apr. 10, 2020, the disclosure of which is incorporated herein by reference in its entirety.

BACKGROUND

Exemplary embodiments of the present disclosure pertain to busbars and more specifically to a busbar with tailored perforation sizes to provide a thermal path.

In general, the electric power converter includes an inverter circuit that receives DC (direct current) power and generates AC (alternating current) power, and a control circuit that controls the inverter circuit. A smoothing DC link capacitor may be applied in parallel with the DC input to minimize the effects of load variation and power switching ripple current losses. The connection may be made by a busbar that electrically connects the smoothing capacitor and a power module, for example. One important limitation in such connections is related to the increase in heat/current density due to miniaturization.

BRIEF DESCRIPTION

Disclosed is an assembly, comprising: a busbar that includes: a first layer, wherein: the first layer defines: a first layer top surface; a first layer bottom surface; a first layer first end; a first layer second end; and a first layer center region between the first layer first and second ends; and the first layer forms first layer perforations of different sizes about the first layer center region so that perforations closer to the first layer first end are smaller than perforations spaced apart from the first layer first end; a second layer, wherein the second layer is disposed against the first layer bottom surface and electrically isolated from the first layer, and wherein the second layer defines connector orifices, having a same size as each other, that are aligned with the first layer perforations; and a first capacitor, wherein the first capacitor is supported against and electrically connected to the first layer top surface, and wherein the first capacitor includes busbar connectors, and the busbar connectors respectively extend through the first layer perforations to electrically connect with the connector orifices.

In addition to one or more features disclosed above, or as an alternate, same sized perforations are positioned equidistant from the first layer first end.

In addition to one or more features disclosed above, or as an alternate, the first layer perforations are positioned along an arcuate axis.

In addition to one or more features disclosed above, or as an alternate, the first layer perforations are spaced apart from each other by a same pitch along the arcuate axis.

In addition to one or more features disclosed above, or as an alternate, the arcuate axis is a circumferential axis that defines a circle.

In addition to one or more features disclosed above, or as an alternate, a first perforation is closest to the first layer first end is smaller than each other of the first layer perforations.

In addition to one or more features disclosed above, or as an alternate, a second perforation is furthest from the first layer first end and is larger than each other of the first layer perforations.

In addition to one or more features disclosed above, or as an alternate, the first layer perforations include pairs of perforations between the first and second perforations.

In addition to one or more features disclosed above, or as an alternate, the pairs of perforations include: a first pair of perforations that is closer to the first perforation than the second perforation; a second pair of perforations that is closer to the second perforation than the first perforation; a third pair of perforations that is intermediate the first and second pairs of perforations, and wherein: the first pair of perforations is smaller than the third pair of perforations; and the third pair of perforations is smaller than the second pair of perforations.

In addition to one or more features disclosed above, or as an alternate, the connector orifices are threaded holes; and the busbar connectors respectively connect to the connector orifices via bolts. The assembly of claim 10, further comprising: an insulation layer disposed against the first layer bottom surface, wherein the insulation layer forms insulation apertures that are respectively aligned with the first layer perforations. The assembly of claim 1, further comprising: a cooling plate connected to the first, second or third layer. An assembly, comprising: a first layer that defines: a first layer first end; a first layer second end; and a first layer center region between the first layer first and second ends, wherein first layer connector orifices are formed about the first layer center region; and a second layer disposed against the first layer, wherein the second layer defines: a second layer first end; a second layer second end; and a second layer center region between the second layer first and second ends, wherein second layer connector orifices are formed about the second layer center region; and a third layer disposed against the first layer, wherein the third layer defines: a third layer first end; a third layer second end; and a third layer center region between the third layer first and second ends, wherein third layer connector orifices are formed about the third layer center region; and a cooling plate located at the first end of the first layer, or second layer, or third layer.

In addition to one or more features disclosed above, or as an alternate, the busbar includes a third layer, wherein the first, second and third layers are electrically insulated from each other; and the assembly further includes a second capacitor, wherein the second capacitor is electrically connected to the second and third layers.

In addition to one or more features disclosed above, or as an alternate, the assembly is configured so that, in operation, the first layer is a positive busbar layer, the second layer is a neutral busbar layer and the third layer is a negative busbar layer.

A method of manufacturing an assembly, comprising: providing a first layer of a busbar that defines: a first layer top surface; a first layer bottom surface; a first layer first end; a first layer second end; a first layer center region between the first layer first and second ends; forming, about the first layer center region, first layer perforations of different sizes so that perforations closer to the first layer first end are smaller than perforations spaced apart from the first layer first end; positioning a second layer of the busbar against the first layer bottom surface so that the first and second layers are electrically isolated from each other, wherein the second layer defines connector orifices, having a same size as each other, that are aligned with the first layer perforations; supporting a first capacitor against the first layer top surface; and electrically connecting busbar connectors of the first capacitor with the connector orifices through the first layer perforations.

In addition to one or more aspects disclosed above, or as an alternate, forming the first layer perforations includes positioning the first layer perforations so that same sized perforations are equidistant from the first layer first end.

In addition to one or more aspects disclosed above, or as an alternate, forming the first layer perforations includes positioning the first layer perforations along an arcuate axis so that the first layer perforations are spaced apart from each other by a same or various pitch.

In addition to one or more features disclosed above, or as an alternate, the method includes electrically connecting a second capacitor to the second layer and a third layer of the busbar so that the first, second and third layers are electrically isolated from each other.

In addition to one or more features disclosed above, or as an alternate, the method includes configuring the first, second and third layers so that, in operation, the first layer is a positive busbar layer, the second layer is a neutral busbar layer and the third layer is a negative busbar layer.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
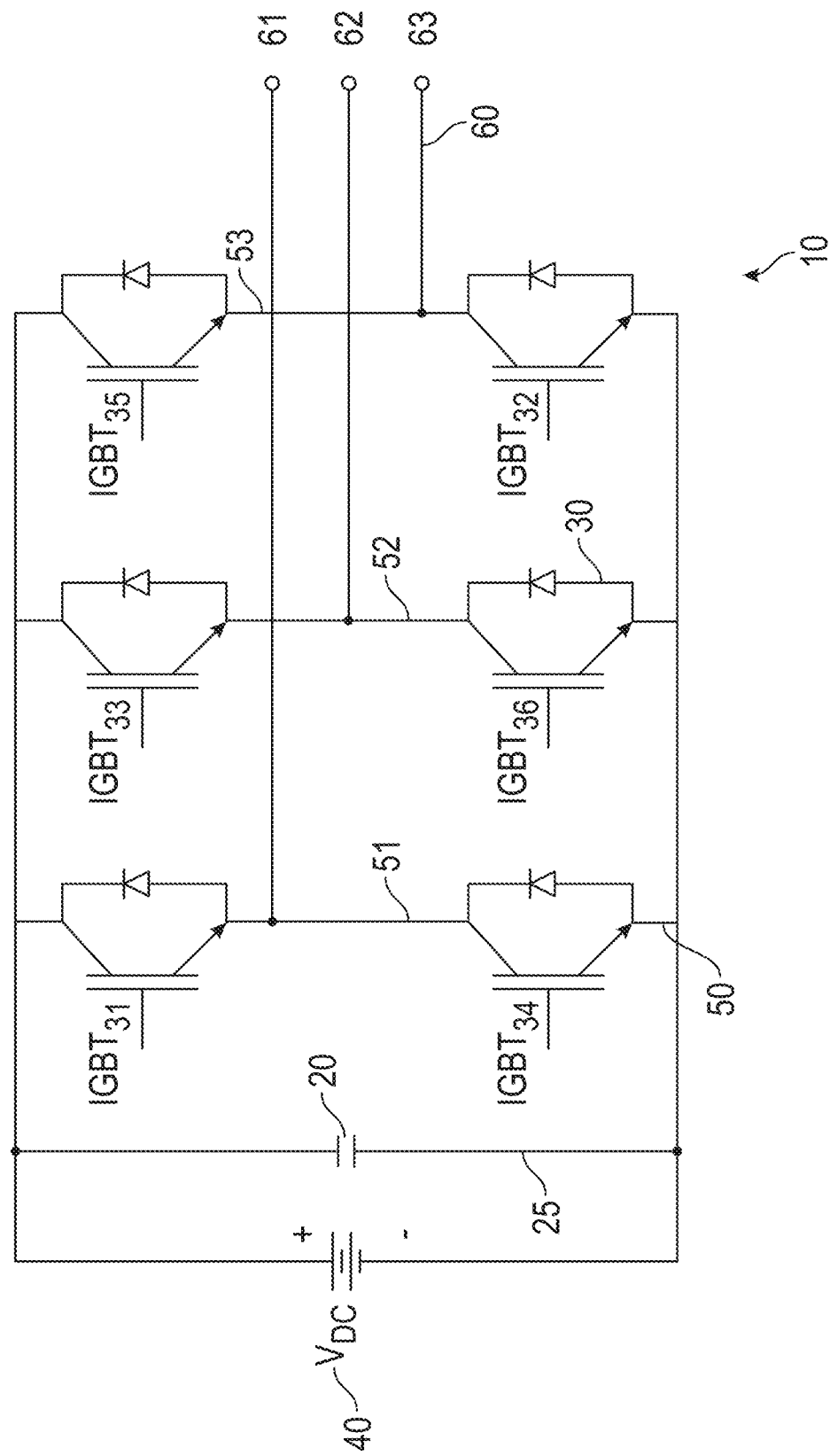
FIG. 1 is a schematic illustration of an inverter according to an embodiment.

Turning to FIG. 1, power conversion electronics may involve an inverter 10 that includes electrical components (e.g., one or more smoothing DC (direct current) link capacitors 20) and layered busbars 25 that connect the capacitors 20 to sets of insulated-gate bipolar transistors (IGBTs, generally identified as 30) connected in parallel with each other and a DC input source such as a battery 40. FIG. 1 illustrates six IGBTs 30 (IGBT 31-IGBT 36) distributed on three parallel branches 50 (individually labeled 51-53). Each of the branches 50 has an output branch 60 (individually labeled 61-63) positioned between pairs of the IGBTs 30. In addition, the capacitors 20 are between the battery 40 and the IGBTs 30. However, this configuration is not intended on limiting the scope of the disclosure.

During operation, temperatures in the components should remain within predetermined limits. Reducing a temperature gradient in the busbar layers may ensure temperature in a capacitor connected to the busbar layers stays sufficiently low. However, a bottleneck for heat flow away from a capacitor may be holes (or perforations) that are formed in the busbar layers to allow an electric connection from the capacitor to one of the busbar layers.

Figure 2:
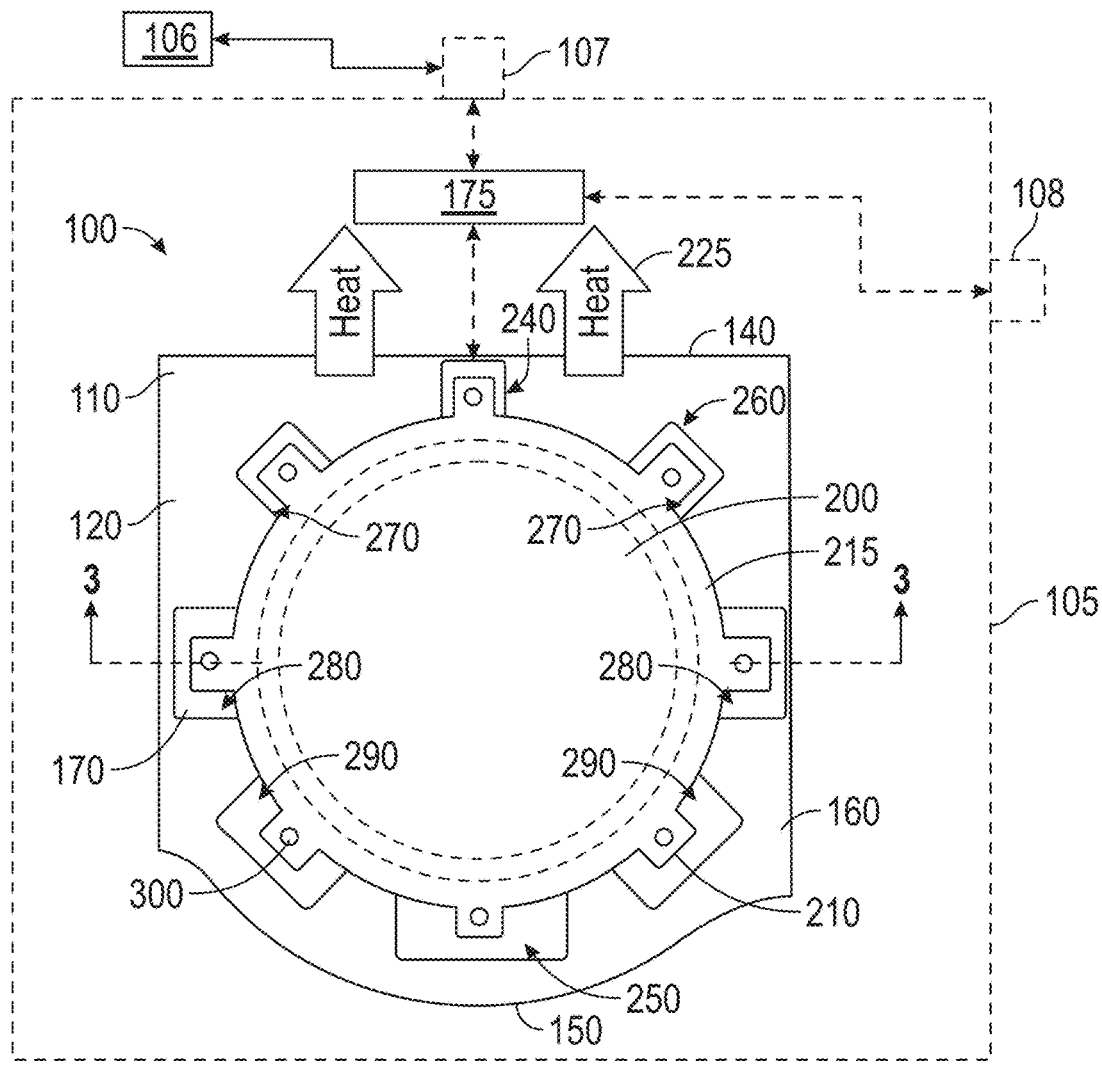
FIG. 2 shows an assembly that includes busbar layers electrically connected to capacitors according to an embodiment.
Figure 3:
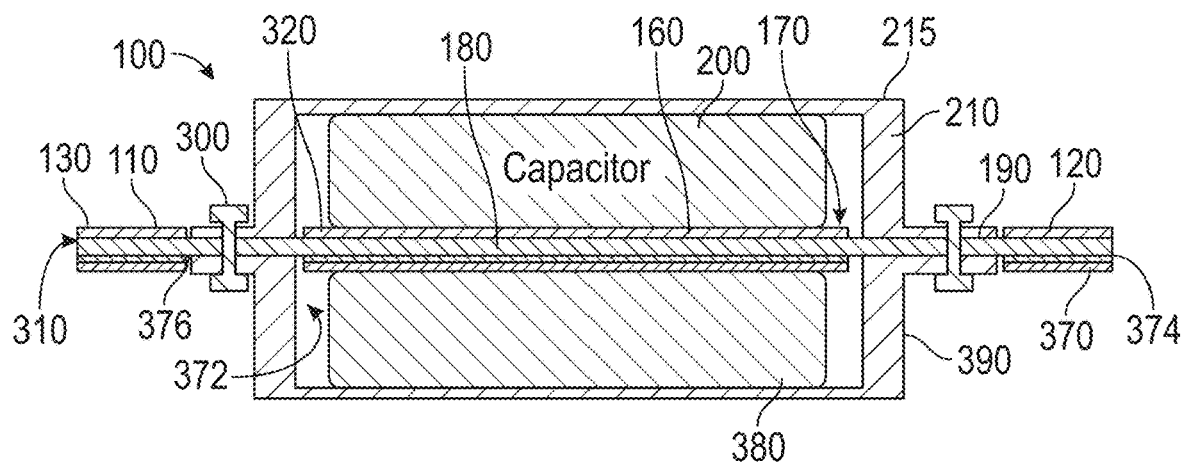
FIG. 3 shows the assembly of FIG. 2 taken along section lines 3-3 according to an embodiment.

In view of the identified concerns, turning now to FIGS. 2 and 3, an assembly 100 that may be connected to or part of an inverter 105 (illustrated schematically in FIG. 2) is illustrated according to embodiments. The inverter 105 is configured to convert DC power, e.g., from a battery 106 (illustrated schematically) at input terminals 107 (illustrated schematically) to AC power at output terminals 108 (illustrated schematically). Though the element numbers in FIG. 1 differ from those in FIGS. 2-5, components with the same nomenclature should be construed the same.

Figure 4:
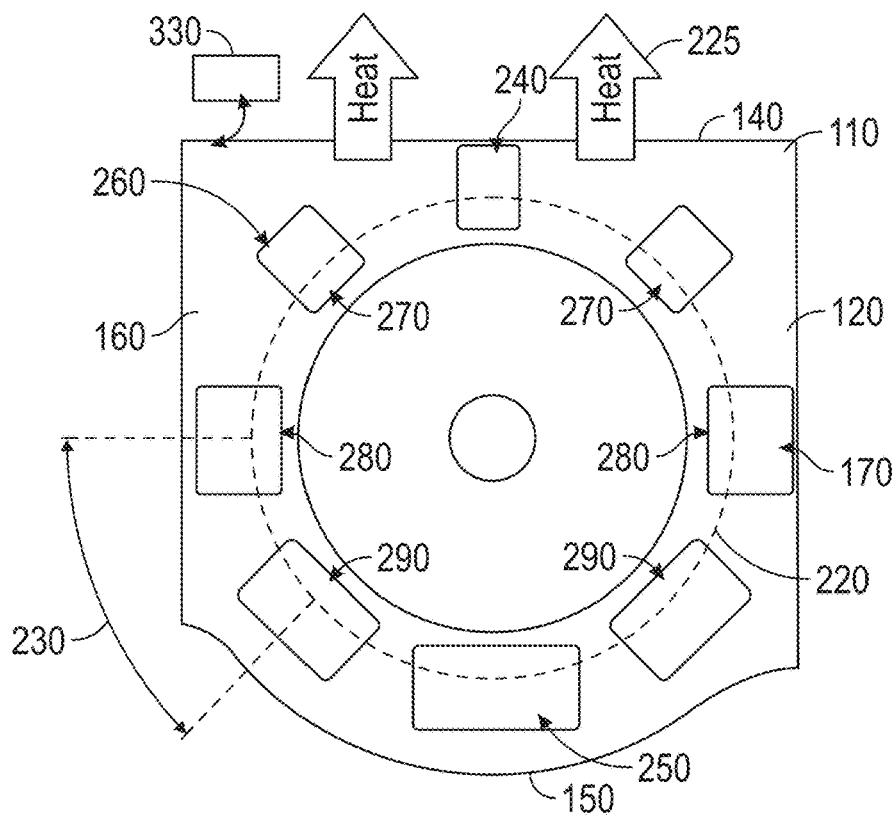
FIG. 4 shows a first busbar layer of the assembly of FIG. 2 according to an embodiment.

The assembly 100 includes a first busbar layer (first layer) 110, which is also illustrated by itself in FIG. 4. The first layer 110 defines a first layer top surface 120, a first layer bottom surface 130, a first layer first end 140, a first layer second end 150, and a first layer center region 160 between the first layer first and second ends 140, 150. The first layer 110 forms first layer perforations 170 (otherwise referred to as first layer connector orifices) of different sizes about the first layer center region 160. With this configuration, perforations (e.g. a first perforation 240) of the first layer perforations 170 that are closer to the first layer first end 140 are smaller than perforations (e.g., a second perforation 250) of the first layer perforations 170 that are spaced apart from the first layer first end 140.

Figure 5:
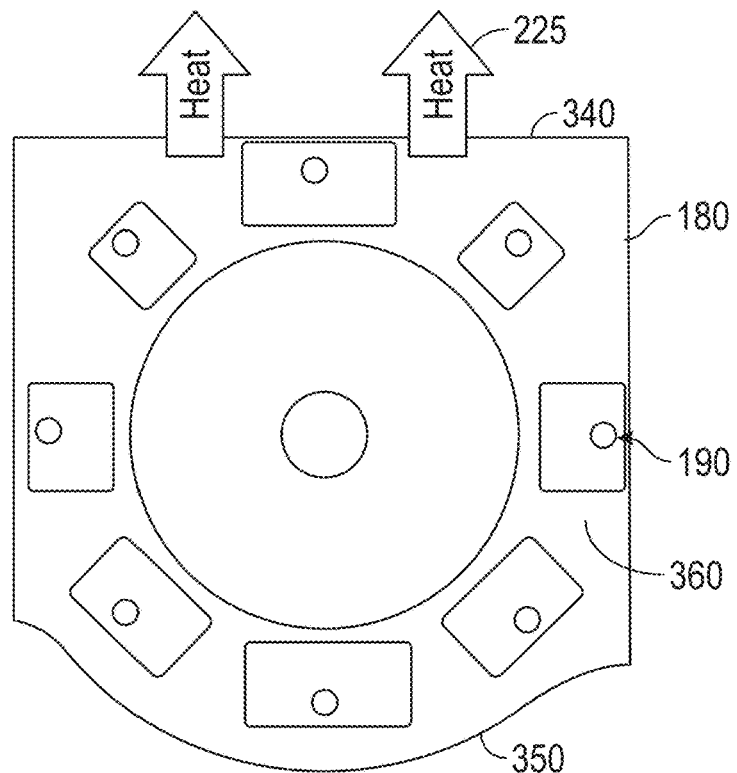
FIG. 5 shows a second busbar layer of the assembly of FIG. 2 according to an embodiment.

A second busbar layer (second layer) 180 is disclosed, which is also illustrated by itself in FIG. 5. The second layer 180 is disposed against the first layer bottom surface 130 and is electrically isolated from the first layer 110. The second layer 180 defines second layer perforations 190 (alternatively referred to as second layer connector orifices), having a same size as each other, that are aligned with the first layer perforations 170.

A first capacitor 200, which may function as a smoothing capacitor, is also disclosed. The first capacitor 200 is supported against and electrically connected to the first layer top surface 120, e.g., the electrical connect exists where it is seated. The first capacitor 200 includes busbar connectors 210 that respectively extend through the first layer perforations 170 to electrically connect with the connector orifices 190. The busbar connectors 210 may be formed as leads of a capacitor cap 215. For example, the capacitor cap 215 secures the capacitor 200 to the assembly 100 via the busbar connectors 210. The electrical connections disclosed herein between the first capacitor 200 (and second capacitor 380 disclosed in greater detail below) and the first and second layers 110, 180 (and third busbar layer (third layer) 370 disclosed in greater detail below) may be referred to as the capacitor portion of the assembly 100.

With this configuration, heat transfer may be improved by directing heat flow, i.e. from the capacitor portion (the first layer center region 160) of the first layer 110 to the power module portion of the first layer 110. The power module portion support a power module 175 (illustrated schematically in FIG. 2), e.g. at the first layer first end 140. The power module 175 may be, for example, an IGBT (insulated-gate bipolar transistor) array electrically connected between the DC input terminals 107 and the first capacitor 200 and second capacitor 380. The power module 175 is connected to the output AC terminals 108. The IGBT is a three-terminal power semiconductor device primarily used as an electronic switch to combine high efficiency and fast switching. The electrical connections disclosed herein within the assembly 100 between the power module 175 and the first, second and third layers 110, 180, 370 may be referred to as the power module portion of the assembly 100. As illustrated the power module portion of the assembly 100 is electrically connected between the input terminals 107 and the capacitor portion of the assembly 100. In addition, the power module portion of the assembly 100 is electrically connected to the output terminals 108.

By reducing the perforation sizes toward the power module portion of the first layer 110, an effective heat flow area is increased. This reduces a thermal resistance along a desired thermal path and directs heat in a heat transfer direction 225 away from the capacitor 200, to reduce a temperature of the capacitor 200. The generated heat may be evenly divided among the first and second layer 110, 180 and directed in the same heat transfer direction 225. This may avoid overheating of the capacitor 200 and ensure desired operational characteristics of an inverter configured with the assembly 100.

According to an embodiment, same sized perforations (e.g., a first pair of perforations 270) of the first layer perforations 170 are positioned equidistant from the first layer first end 140. The first layer perforations 170 may be positioned along an arcuate axis 220. The first layer perforations 170 may be spaced apart from each other by a same or various pitch 230 along the arcuate axis 220 (FIG. 4). The arcuate axis 220 may be a circumferential axis that defines a circle.

In one embodiment, the first perforation 240 of the first layer perforations 170 is closest to the first layer first end 140. The first perforation 240 may be smaller than each other of the first layer perforations 170. The second perforation 250 of the first layer perforations 170 may be furthest from the first layer first end 140. The second perforation 250 may be larger than each other of the first layer perforations 170.

The first layer perforations 170 may include pairs of perforations 260 between the first and second perforations 240, 250. The first pair of perforations 270 of the pairs of perforations 260 may be closer to the first perforation 240 than the second perforation 250. A second pair of perforations 290 of the pairs of perforations 260 may be closer to the second perforation 250 than the first perforation 240. A third pair of perforations 280 of the pairs of perforations 260 may be intermediate the first and second pairs of perforations 270, 290. The first pair of perforations 270 may be the same size as each other and smaller than the third pair of perforations 280. The third pair of perforations 280 may be the same size as each other and smaller than the second pair of perforations 290.

According to another aspect of the disclosed embodiments the connector orifices 190 may be threaded holes. The busbar connectors 210 may respectively connect to the connector orifices 190 via bolts 300.

A first insulation layer 310 (generally referred to as an insulation layer, shown in FIG. 3) may be disposed against the first layer bottom surface 130, between the first and second layer 110, 180. The first insulation layer 310 may form insulation apertures 320 (FIG. 3) that are respectively aligned with the first layer perforations 170. The insulation apertures 320 may have the same shape as the first layer perforations 170 so that a top view of the first insulation layer 310 may be the same as that for the first layer 110 as shown in FIG. 4.

A cooling plate 330 (illustrated schematically in FIG. 4) may be connected to the first layer 110, second layer 180, or third layer 370 to dissipate generated heat. More specifically, the first layer 110 may define a first layer first end 140, a first layer second end 150, and a first layer center region 160 between the first layer first end and second end 140, 150. The first layer perforations 170 (otherwise referred to as first layer connector orifices) may be formed about the first layer center region 160. As shown in FIG. 4, the cooling plate 330 may be located at or near the first layer first end 140. Similarly, the cooling plate 330 may be located at or near the second layer first end 340. The second layer first end 340 may be aligned with the first layer first end 140. A second layer second end 350 may be aligned with the first layer second end 150. A second layer center region 360, between the second layer first and second ends 340, 350, may be aligned with the first layer center region 160. Thus, the overall shape or at least a portion (e.g., as shown in FIG. 5) of the second layer 180 and the third layer 370 may be like that of the first layer 110. Similarly, the cooling plate 330 may also be located at or near the third layer first end, which may be aligned with the first layer first end 140. It is to be appreciated that the cooling plate 330 may dissipate heat from each of the layer 110, 180 that has been transmitted along the heat transfer direction 225.

According to an embodiment, the assembly 100 further includes the third busbar layer (third layer) 370 (shown in FIG. 3) which may configured, at least in part, the same as the first layer 110. For example, the third layer 370 may include third layer perforations 372 (alternatively referred to as third layer connector orifices) having the same pattern as the first layer perforations 170 as shown in FIG. 4. The first, second and third layers 110, 180, 370 (e.g., forming three busbar layers) may be electrically insulated from each other. For example, a second insulation layer 374, configured similarly to the first insulation layer 310, may be disposed between the second and third layers 180, 370. Similarly to the first insulation layer 310, the second insulation layer 374 may have second insulation layer apertures 376 that correspond with the third layer perforations 372.

A second capacitor 380, functioning as another smoothing capacitor, may be electrically connected to the second and third layers 180, 370 similarly to the connection between the first capacitor 200 and the first and second layers 110, 180. For example, the second capacitor 380 may connect to the third layer 370 where it is seated. Additionally, the second capacitor connectors 390 may extend through the third layer 370 to connect with the second layer 180. According to an embodiment the assembly 100 is configured so that, in operation, the first busbar 110 is a positive (+) busbar layer, the second layer 180 is a neutral (N) busbar layer and the third layer 370 is a negative (−) busbar layer.

Figure 6:
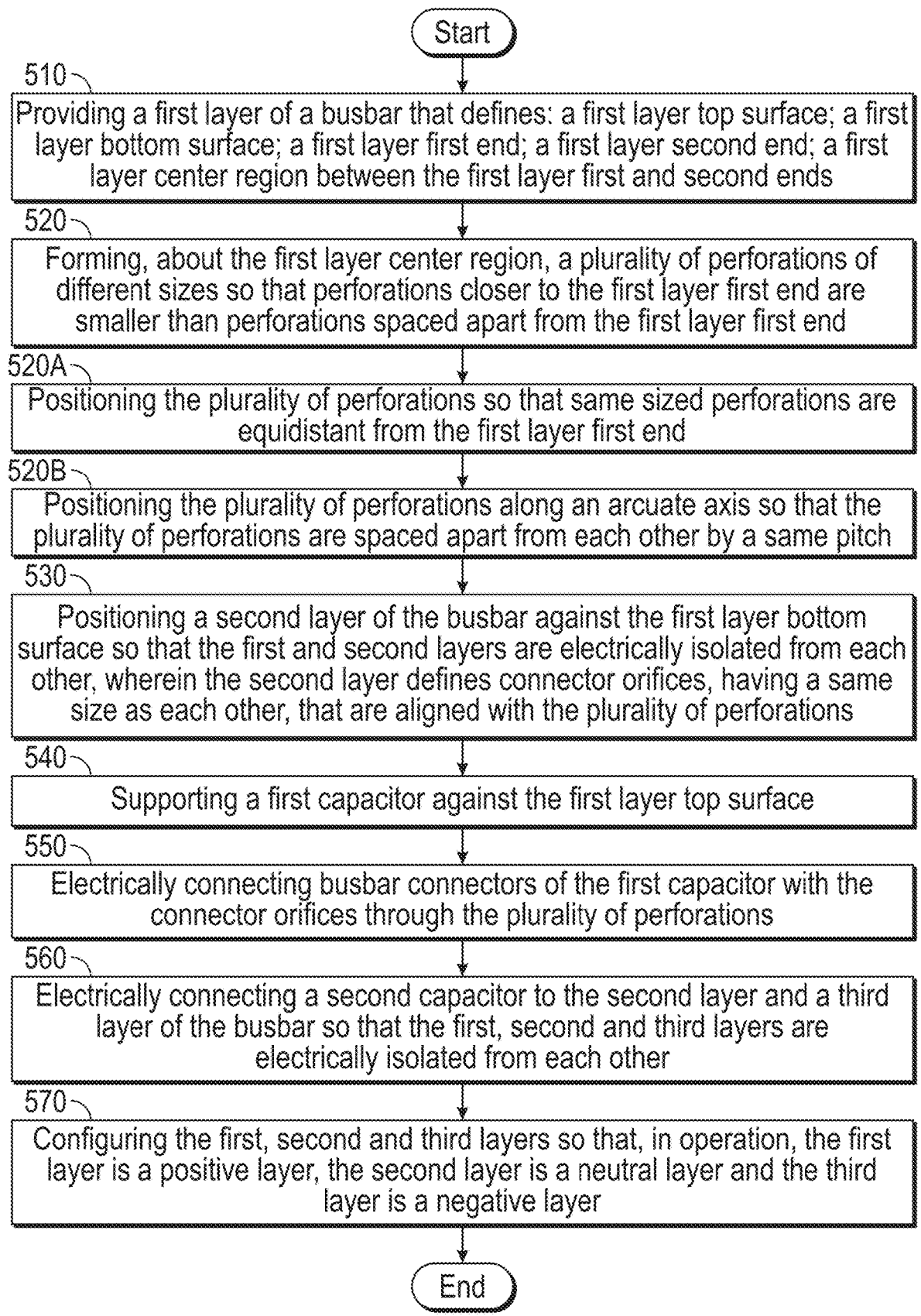
FIG. 6 is a flowchart showing a method of manufacturing the assembly of FIG. 2 according to an embodiment.

As shown in FIG. 6, further disclosed is a method of manufacturing an assembly. As shown in block 510, the method may include providing the first layer 110 that defines the first layer top surface 120 and the first layer bottom surface 130. The first layer 110 further defines the first layer first end 140, the first layer second end 150, and the first layer center region 160 between the first layer first and second ends 140, 150. As shown in block 520, the method may include forming, about the first layer center region 160, the first layer perforations 170 of different sizes. With this configuration, as indicated, perforations (e.g. the first perforation 240) of the first layer perforations 170 that are closer to the first layer first end 140 are smaller than perforations (e.g. the second perforation 250) of the first layer perforations 170 spaced apart from the first layer first end 140.

As shown in block 520A, forming the first layer perforations 170 may include positioning the first layer perforations 170 so that same sized perforations (e.g., the first pair of perforations 270) of the first layer perforations 170 are equidistant from the first layer first end 140. As shown in block 520B, forming the first layer perforations 170 may include positioning the first layer perforations 170 along an arcuate axis 220. In an embodiment the first layer perforations 170 may be spaced apart from each other by a same or various pitch 230.

As shown in block 530, the method may further include positioning a second layer 180 against the first layer bottom surface 130 so that the first and second layers 110, 180 are electrically isolated from each other. The second layer 180 may define the connector orifices 190, having a same size as each other, that are aligned with the first layer perforations 170.

As shown in block 540, the method may include supporting the first capacitor 200 against the first layer top surface 120. As shown in block 550, the method may further include electrically connecting the busbar connectors 210 of the first capacitor 200 with the connector orifices 190 through the first layer perforations 170.

As shown in block 560, the method may further include electrically connecting the second capacitor 380 to the second layer 180 and the third layer 370. As indicated, the first, second and third layers 110, 180, 370 may be electrically isolated from each other. As shown in block 570, the method may further include configuring the first, second and third layers 110, 180, 370 so that the first layer 110 is a positive busbar layer, the second layer 180 is a neutral busbar and the third layer 370 is a negative busbar layer.

The above disclosed embodiments provide for reducing the capacitor temperature by decreasing the temperature gradient around the capacitor. In the disclosed embodiments, the temperature gradient is reduced by designing a tailored configuration of the perforations surrounding the capacitor, on the busbar layer to which the capacitor is electrically connected and supported. The tailored perforations may result in a minimum thermal resistance in the thermal path from the capacitor portion of the busbar layer to the power module portion of the busbar module. With the tailored perforations, an effective cross-sectional area for heat flow may be maximized, so that an overall thermal resistance may be reduced, resulting in lower operational capacitor and busbar layer temperatures.

More specifically, in the above disclosed embodiments, heat transfer may be improved by directing heat flow, i.e. from the capacitor portion of the busbar (e.g., with the combined layers) to the power module portion of the busbar. By reducing the perforation sizes toward the power module portion of the busbar, a circumferential spacing between adjacent perforations is increased, which also increases conductive material in the same areas. This reduces a thermal resistance along a desired thermal path and directs heat away from the capacitor to reduce a temperature of the capacitor. This may avoid overheating of the capacitor and ensure a desired performance of the inverter. In the disclosed embodiments, heat transfer from the capacitor may be distributed evenly between the busbar layers.

The terminology used herein is for the purpose of describing embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a situation or material to the teachings of the present disclosure without departing from the essential scope thereof. Therefore, it is intended that the present disclosure not be limited to the embodiments disclosed as the best mode contemplated for carrying out this present disclosure, but that the present disclosure will include all embodiments falling within the scope of the claims.

What is claimed is:

1. An assembly, comprising:
a busbar that includes:
   a first layer, wherein:
      the first layer defines: a first layer top surface; a first layer bottom surface; a first layer first end; a first layer second end; and a first layer center region between the first layer first and second ends; and
      the first layer forms first layer perforations of different sizes about the first layer center region so that perforations closer to the first layer first end are smaller than perforations spaced apart from the first layer first end;
   a second layer, wherein the second layer is disposed against the first layer bottom surface and electrically isolated from the first layer, and wherein the second layer defines connector orifices, having a same size as each other, that are aligned with the first layer perforations; and
   a first capacitor, wherein the first capacitor is supported against and electrically connected to the first layer top surface, and wherein the first capacitor includes busbar connectors, and the busbar connectors respectively extend through the first layer perforations to electrically connect with the connector orifices.

2. The assembly of claim 1, wherein:
same sized perforations are positioned equidistant from the first layer first end.

3. The assembly of claim 2, wherein:
the first layer perforations are positioned along an arcuate axis.

4. The assembly of claim 3, wherein:
the first layer perforations are spaced apart from each other by a same or various pitch along the arcuate axis.

5. The assembly of claim 4, wherein:
the arcuate axis is a circumferential axis that defines a circle.

6. The assembly of claim 5, wherein:
a first perforation is closest to the first layer first end is smaller than each other of the first layer perforations.

7. The assembly of claim 6, wherein:
a second perforation is furthest from the first layer first end and is larger than each other of the first layer perforations.

8. The assembly of claim 7, wherein:
the first layer perforations include pairs of perforations between the first and second perforations.

9. The assembly of claim 8, wherein
the pairs of perforations include:
   a first pair of perforations that is closer to the first perforation than the second perforation;
   a second pair of perforations that is closer to the second perforation than the first perforation;
   a third pair of perforations that is intermediate the first and second pairs of perforations, and
   wherein:

the first pair of perforations is smaller than the third pair of perforations; and the third pair of perforations is smaller than the second pair of perforations.

10. The assembly of claim 1, wherein:

the connector orifices are threaded holes; and the busbar connectors respectively connect to the connector orifices via bolts.

11. The assembly of claim 10, further comprising:

an insulation layer disposed against the first layer bottom surface, wherein the insulation layer forms insulation apertures that are respectively aligned with the first layer perforations.

12. The assembly of claim 1, further comprising:

a cooling plate connected to the first, second or third layer.

13. The assembly of claim 1, wherein the busbar includes a third layer, wherein the first, second and third layers are electrically insulated from each other; and the assembly further includes a second capacitor, wherein the second capacitor is electrically connected to the second and third layers.

14. The assembly of claim 13, wherein:

the assembly is configured so that, in operation, the first layer is a positive busbar layer, the second layer is a neutral busbar layer and the third layer is a negative busbar layer.

15. A method of manufacturing an assembly, comprising:

providing a first layer of a busbar that defines: a first layer top surface; a first layer bottom surface; a first layer first end; a first layer second end; a first layer center region between the first layer first and second ends;

forming, about the first layer center region, first layer perforations of different sizes so that perforations closer to the first layer first end are smaller than perforations spaced apart from the first layer first end;

positioning a second layer of the busbar against the first layer bottom surface so that the first and second layers are electrically isolated from each other, wherein the second layer defines connector orifices, having a same size as each other, that are aligned with the first layer perforations;

supporting a first capacitor against the first layer top surface; and electrically connecting busbar connectors of the first capacitor with the connector orifices through the first layer perforations.

16. The method of claim 15, wherein:

forming the first layer perforations includes positioning the first layer perforations so that same sized perforations are equidistant from the first layer first end.

17. The method of claim 16, wherein:

forming the first layer perforations includes positioning the first layer perforations along an arcuate axis so that the first layer perforations are spaced apart from each other by a same or various pitch.

18. The method of claim 15, further comprising:

electrically connecting a second capacitor to the second layer and a third layer of the busbar so that the first, second and third layers are electrically isolated from each other.

19. The method of claim 18, further comprising:

configuring the first, second and third layers so that, in operation, the first layer is a positive busbar layer, the second layer is a neutral busbar layer and the third layer is a negative busbar layer.

\* \* \* \* \*